Patented Apr. 18, 1933

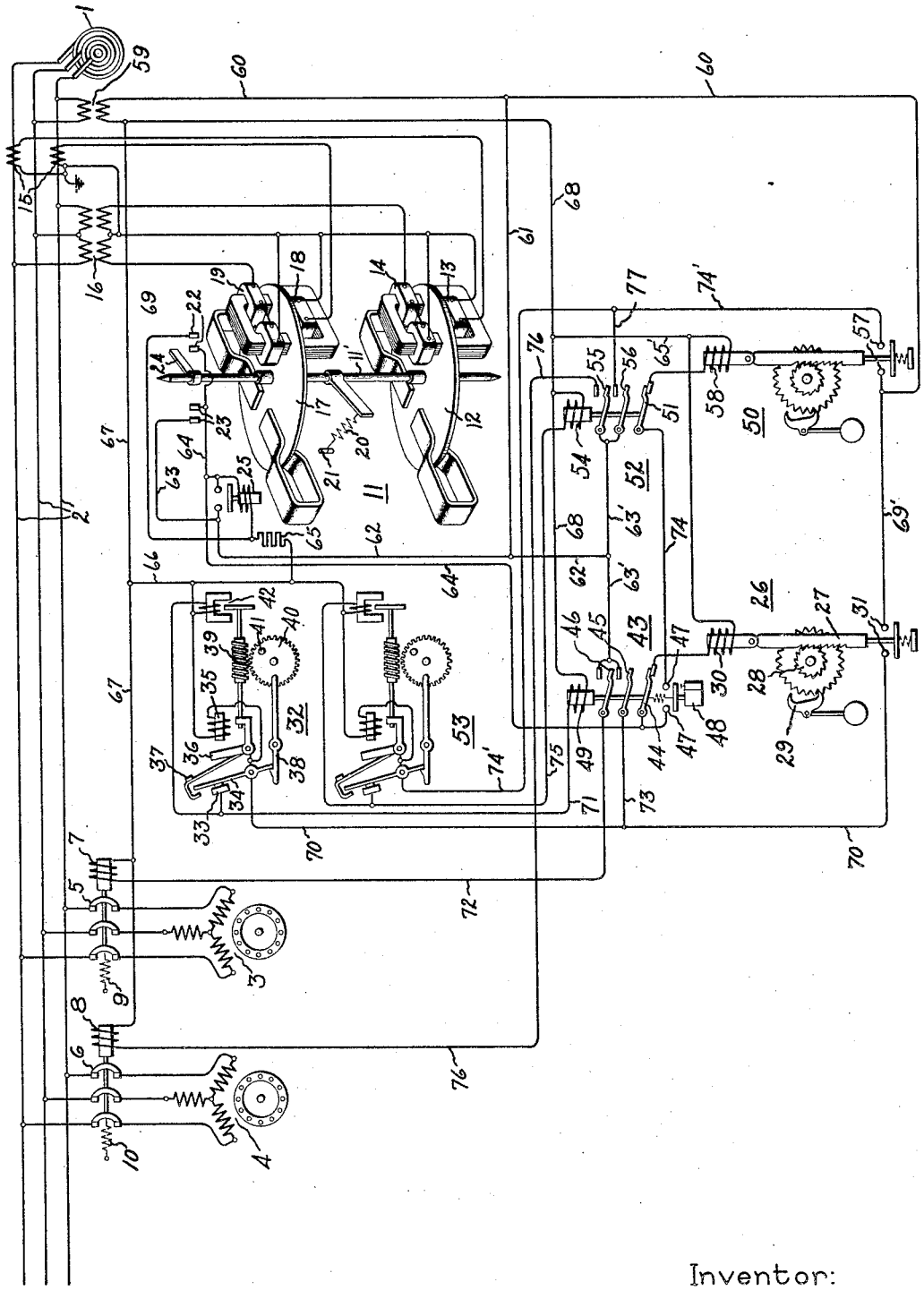

1,904,500

REISSUED

UNITED STATES PATENT OFFICE

DAVID W. McLENEGAN, OF SCHENECTADY, NEW YORK, ASSIGNOR TO GENERAL ELECTRIC COMPANY, A CORPORATION OF NEW YORK

ELECTRICAL REGULATING SYSTEM

Application filed November 21, 1930. Serial No. 497,211.

My invention relates to electrical regulating systems, and more particularly to electrical load regulating systems.

Commercial rates for electrical energy purchased in large quantities usually include a charge known as a demand charge. This charge is proportional to the divergence between the maximum average rate at which energy is used, as measured over comparatively short time intervals, five minutes for example, and the total average rate at which energy is used, as measured over a longer period, usually the billing period of a week or month. The purpose of such a charge is to pay the investment and depreciation charges on the normally idle generating apparatus which is standing by to supply the peak or maximum demand loads.

From the above it will be clear that the demand charge of a consumer whose average rate of energy consumption equals his total average rate of consumption will be zero, for such a user will have no appreciable peak load. For many practical reasons such a user seldom, if ever, exists. It is quite possible, however, to limit a user's peak load or maximum demand and this greatly reduces the magnitude of the demand charge. Such limiting of the peak load may be achieved by various load regulating systems which are well known to those skilled in the art. These systems usually have a master overpower relay for controlling the reduction of load when it tends to exceed a predetermined amount.

It has been found that often the peak loads are of only momentary duration and that they will not affect the demand charge. It has also been found that usually where a peak load persists it will persist for more than the usual demand period. If then an ordinary overpower relay removes the increment of load every time the load exceeds a predetermined value, it will subject the regulating equipment to unnecessary wear and tear. Furthermore, if the increment of load which is removed produces a total load below the value for which the overpower relay is set, the increment of load will again be added thus causing the regulating system to hunt, which will be injurious to the life of its component parts.

In accordance with my invention I provide an improved load regulating system which has a time delay action in removing a load increment after the total load exceeds a predetermined value and which maintains said load increment removed for a predetermined time regardless of the value of the total load.

An object of my invention is to provide a new and improved load regulating system.

Another object of my invention is to provide a load regulating system which will automatically remove a load increment a predetermined time after the total load exceeds a predetermined value.

A further object of my invention is to provide a load regulating system which removes a load increment, upon the total load exceeding a predetermined value, for a predetermined time.

An additional object of my invention is to provide a load regulating system for successively removing load increments in the manner described in the two preceding objects.

My invention will be better understood from the following description taken in connection with the accompanying drawing and its scope will be pointed out in the appended claims.

Referring now to the single figure of the accompanying drawing, wherein I have shown a diagrammatic representation of a preferred embodiment of my invention, 1 is a suitable source of electrical energy, shown as a polyphase alternating current generator, which is connected to a power supply or load circuit 2 for supplying power to a variable load shown as including two polyphase induction motors 3 and 4. The load devices 3 and 4 are connected to circuit 2 through suitable circuit controlling means 5 and 6, which have circuit opening operating windings 7 and 8 respectively and circuit closing biasing means 9 and 10 respectively.

Although I have only shown two load devices connected to the power supply circuit 2 there may be, and in actual practice probably will be, many other load devices supplied with power from this circuit. Load devices 3 and 4 may be removed and reconnected to circuit 2 through the control of their respective circuit controllers 5 and 6 and this is done by my load regulating system in a manner to maintain the total load on circuit 2 substantially constant. It should be noted, however, that my invention is not limited to the removal and reconnection of separate load devices in performing its regulating function and it will be obvious to those skilled in the art that by suitable circuit controlling means increments of load may successively be removed from a single load device such as an electric water heater or electrically operated air compressor without departing from my invention in its broader aspects.

The main control element of my regulating system comprises a power responsive overpower relay 11. This relay is essentially a polyphase induction contact making wattmeter having a shaft 11' actuated by a disc 12 which is acted upon by the usual current coil 13 and potential coils 14, which are connected to circuit 2 through the usual connections involving current transformers 15 and potential transformers 16. A similar disc 17 is mounted on the shaft 11' and acted upon by corresponding current coil 18 and potential coils 19. Each of these assemblies comprising a disc and its potential and current coils, produces a torque on shaft 11' proportional to the power flow in one of the phases of the polyphase circuit. The torque produced on the shaft 11' is opposed by a spring 20 attached thereto and whose tension may be adjusted by means of a nut 21. Relay 11 is provided with stationary underpower contacts 22 and stationary overpower contacts 23, each of these pairs of contacts being adapted to be bridged by a movable bridging contact 24 which is mounted on the shaft 11' and moved by the relay.

Although it is not necessary to my invention, I prefer to provide relay 11 with an auxiliary relay 25 the purpose of which is to relieve the contacts of the relay 11 of carrying a relatively heavy control current and also to relieve these contacts from having to break such a current. In this manner the life of the contacts of relay 11 is increased. Auxiliary relay 25 has the additional function of providing a positive closure of the control circuit as soon as the overpower contacts of relay 11 are bridged. Were it not for this auxiliary relay the engagement of the bridging contact 24 with overpower contacts 23 might be so light and of such a fluttering nature as to cause damaging arcing at these contacts.

At this point I wish to explain that my invention is not necessarily limited to the use of a power responsive relay. Thus it will be apparent to those skilled in the art that if the voltage and power factor conditions on circuit 2 are substantially constant, a current relay might be substituted for the power relay, for under such conditions the current would be an accurate measure of the power flow in the circuit.

Controlled by power responsive relay 11 is a normally open time delayed closing relay 26. This relay may be of any suitable type and as shown comprises a pivotally mounted member 27 which engages a toothed gear wheel 28 which turns a time delay escapement mechanism 29. An operating magnet 30, when energized, draws member 27 upwardly against the delaying action of escapement 29 thereby to close contacts 31 after a predetermined time.

Under the control of time delay closing relay 26 is a normally closed time delay opening relay 32. This relay, the details of which form no part of the present invention, is described and claimed in United States Letters Patent No. 1,699,125, granted January 16, 1929, upon the application of Hugh M. Stephenson. It comprises essentially a fixed contact 33, a pivotally mounted cooperating contact 34, a magnet 35 which, when energized, attracts an armature 36 for causing a hook member 37 to urge pivotally mounted contact 34 out of engagement with the fixed contact 33. Motion of the pivotally mounted contact 34, is, however, prevented by a pivotally mounted latch member 38. The attraction of armature 36 by magnet 35 also causes worm gear 39 to be lowered into engagement with the gear 40 on which is mounted a pin 41 for tripping latch 38. Connected in parallel with operating magnet 35 is a small motor 42 of any suitable type, which is connected to drive worm gear 39. This motor operates in such a direction that gear 40 turns in a clockwise direction as viewed in the drawing. The operation of relay 32 will now be clear for, if a source of current is connected to the fixed contact 33, which is connected directly to one of the terminals the motor 42, while it is connected indirectly through pivotal contact 34 to one of the terminals of operating magnet 35, the other terminals of the motor and magnet being connected to the other side of the source, the operating magnet 35 will attract armature 36 thereby attracting hook member 37 with the result that the pivotally mounted contact 34 is urged to circuit opening position. However, latch 38 prevents movement of contact 34. During this time the motor 42 is operating to cause the trip pin 41 to approach the right hand end of latch 38 so that when engagement takes place, after a predetermined time, the latch will be tripped and contact 34 will be snapped away from contact 33, thus breaking the circuit. The time it takes for relay 32 to open may be varied in a number of ways, for example, the speed of motor 42 may be made adjustable, or the gear ratio of gears 39 and 40 may be varied or the initial position of trip 41 may be adjusted to any one of a number of possible positions. In this connection the gear 40 of the relay 32 is, in actual practice, provided with a coil spring and a stop for returning the gear to a predetermined initial position as determined by the position of the stop. Thus by adjusting the position of the stop, the initial position of the trip 41 may readily be adjusted and hence the time of action of the relay may be determined.

Under the control of normally closed time delay opening relay 32 is another relay 43 having normally closed contacts 44, normally opened contacts 45 and 46 and normally opened time delay closing contacts 47. Any suitable means for delaying the closing of the latter contacts may be employed, a spring and dashpot combination 48 being shown. This relay is operated by an ordinary operating magnet 49.

Relay 43 has a number of functions. Thus the closure of contacts 46 energizes circuit controlling means 5 for removing load device 3 from circuit 2. The closure of contacts 45 completes a short circuit around the contacts 31 of normally open time delay closing relay 26. The opening of contacts 44 breaks the circuit of operating magnet 30 of relay 26 while the closure of time delayed closing contacts 47 controls a circuit which is also under the control of overpower relay 11 for energizing the operating magnet of relay 50 through normally closed contacts 51 of a relay 52.

The operation of relay 50 completes a circuit controlling a normally closed time delayed opening relay 53. This circuit also includes the operating winding 54 of relay 52. Relays 50, 52 and 53 are identical respectively with relays 26, 43 and 32 except that relay 52 does not have time delay closing contacts corresponding to contacts 47 of relay 43. For this reason a detailed description of these relays is deemed to be unnecessary. Closure of contacts 55 of relay 52 completes a circuit for energizing the operating magnet 8 of circuit controller 6 thereby to disconnect load device 4 from circuit 2. The closure of contacts 56 of relay 52 short circuits the contact 57 of relay 50 while the opening of contacts 51 of relay 52 breaks the circuit for operating magnet 58 of relay 50.

The control circuits for the above described relays and circuit controlling devices may be connected to any suitable source of current supply and, as shown, a suitable transformer 59 connected across one of the phases of circuit 2 is used to supply operating current for the relays.

The operation of the illustrated embodiment of my invention is as follows: Assume that the total load on circuit 2 exceeds a predetermined value as determined by the tension of the spring 20. Power responsive control relay 11 will then produce a counterclockwise torque which exceeds the clockwise torque produced by spring 20 with the result that bridging contact 24 bridges the overpower contacts 23. The bridging of contacts 23 completes a circuit as follows: From one side of the secondary winding of transformer 59, conductor 60, conductor 61, conductor 62, conductor 63, contacts 23 and 24, conductor 64, the operating magnet of auxiliary relay 25, current limiting resistance 65, conductor 66, and conductor 67 back to the other side of the secondary winding of transformer 59. As the contacts of auxiliary relay 25 are in parallel with contacts 23 of overpower relay 11, the operation of the auxiliary relay completes a holding circuit for this relay. Thus, even though the bridging of contacts 23 is very light and only momentary, it will still be sufficient to cause the energization of the auxiliary relay 25.

The circuit for operating time delayed closing relay 26 may now be traced as follows, conductor 64, which it will be remembered is connected to the right hand side of the secondary winding of transformer 59 through a circuit which has already been traced, contacts 44 of relay 43, operating magnet 30 of relay 26, conductor 65, and conductor 68 back to the other side of the secondary winding of transformer 59.

If now the overpower which caused relay 11 to energize its auxiliary relay 25 is only momentary, the torque of relay 11 will become less than the torque produced by spring 20 and relay 11 will turn in a clockwise direction until the contact 24 bridges underpower contacts 22. The bridging of contacts 22 connects conductors 64 and 69 which are connected respectively to the terminals of the operating winding of the auxiliary relay 25, thus short circuiting this winding with the result that the relay opens its contacts. As soon as this takes place the circuit of the operating magnet 30 of relay 26 is broken and this relay returns to its normal position.

If, however, overpower conditions on circuit 2 persist for a predetermined time, relay 26 will close its contacts 31. This will complete an operating circuit for relay 43 as follows, conductors 60, 69', contacts 31, conductor 70, contacts 34 and 33 of relay 32, conductor 71, operating magnet 49, of relay 43, conductor 68 and back to the other side of the secondary winding of transformer 59.

Completion of this circuit also energizes operating magnet 35 and motor 42 of relay 32. Thus the motor 42 is connected between the conductors 66 and 70 by contacts 33 and 34 while operating magnet 35 is connected directly between conductors 66 and 70.

The operation of relay 43 causes load device or load increment 3 to be removed from circuit 2 by means of the following control circuit; conductor 60, conductor 61, conductor 62, conductor 63′, contacts 46, conductor 72, operating coil 5 and conductor 67. The energization of the relay 43 also causes the contacts 31 of relay 26 to be short circuited through the following circuit, conductor 61, conductor 62, conductor 63′, contacts 45 and conductor 73. The energization of relays 32 and 43 is now independent of relay 26. The opening of contacts 44, due to the operation of relay 43, breaks the operating circuit of relay 26 thus allowing this relay to return to its normal open position.

Predetermined time opening relay 32 is now operating and load increment 3 is disconnected from circuit 2. As contacts 44 of relay 43 are open while contacts 31 of relay 26 are short circuited the control of the circuit controlling element 5 has been shifted from power relay 11 to time delayed opening relay 32 so that regardless of power conditions on circuit 2 load 3 will remain disconnected until relay 32 opens.

If the removal of load 3 reduces the total load on circuit 2 to less than the predetermined overpower setting of relay 11, this relay will act to deenergize auxiliary relay 25, as previously explained, so that when slow closing contacts 47 of relay 43 close no circuit will be completed. If, however, the load on circuit 2 still exceeds the value at which overpower relay 11 bridges contacts 23, the closure of contacts 47 will complete the following circuit, conductor 64, which it will be remembered is connected to the right hand side of the secondary winding of transformer 59, contacts 47, conductor 74, contacts 51 of relay 52, operating magnet 58 of time delay closing relay 50, conductor 65′, and conductor 68 back to the other side of the secondary winding of transformer 59. If the overpower condition does not last as long as it takes for the contacts 57 of relay 50 to close, the above circuit will be broken and the relay will return to its normal position. If, however, the overpower persists, contacts 57 of relay 50 will close thereby completing a circuit for the operating magnet 54 of relay 52 through the contacts of relay 53 as follows, conductor 60, contact 57, conductor 74′, the contacts of relay 53, conductor 75, operating magnet 54 and conductor 68 back to the other side of the secondary winding of transformer 59. Thus, relay 52 and time delay opening relay 53 are energized. The closure of contacts 55 of relay 52 completes a circuit to disconnect load increment 4 from circuit 2 as follows, conductors 60, 61, 62, 63′, contacts 55, conductor 76, operating magnet 8 and conductor 67 back to the other side of the secondary winding transformer 59. At the same time the closure of contacts 56 completes a short circuit about contacts 57 of relay 50, this short circuit being as follows, conductors 61, 62, 63′, contacts 56 and conductor 77. The opening of contacts 51 of relay 52 breaks the operating circuit for the magnet 58 of relay 50. This relay therefore returns to its normal position.

As soon as time delayed opening relay 32 operates to open its contacts, relay 43 will be returned to its normal position thus deenergizing circuit controller 5 and reconnecting load device 3 to circuit 2 and as now relay 43 and also relay 26 are in the position shown in the drawing the circuits for the operating magnet 35 and the motor 42 will be broken and relay 32 will again return to its closed position as shown in the drawing. In a similar manner the operation of relay 53 will cause the deenergization of relay 52 with the result that load increment 4 is again connected to circuit 2 and the parts will all return to the position shown in the drawing.

It will be obvious to those skilled in the art that although I have only shown my system as including two steps of unloading, as many additional steps as desired may be added by adding additional relays which are interlocked as are relays 43 and 52 of the drawing without departing from my invention in its broader aspects. Thus relay 52 might be provided with time delayed closing contacts for controlling a normally open time delayed closing relay similar to relays 26 and 50, which relay would control a relay similar to relays 43 and 52 through a normally closed time delay opening relay similar to relays 32 and 53, thereby to remove a third load increment from circuit 2.

While I have shown and described a particular embodiment of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination, an electric circuit, a variable load connected to said circuit, said load including a plurality of load increments, and time delayed acting means responsive to the load on said circuit for removing one of said load increments a predetermined time after the load on said circuit exceeds a predetermined high value.

2. In combination, an electric circuit, a variable load connected to said circuit, said load including a plurality of load increments, means responsive to the load on said circuit for removing one of said load increments a predetermined time after the load on said circuit attains a predetermined high value, and means for causing restoration of said load increment a predetermined time after its removal.

3. A load regulating system comprising a power supply circuit, variable power consumption apparatus connected to be energized by said circuit, means operative in response to a power flow in said circuit which exceeds a predetermined amount, means operative a predetermined time after the operation of said power flow responsive means for removing an increment of load from said circuit, and means for reconnecting said increment of load after a predetermined time regardless of the power flow in said circuit.

4. A load regulating system comprising a power supply circuit, variable power consuming load means energized from said circuit, means responsive to the power flow in said circuit for removing an increment of load from said circuit a predetermined time after said power flow exceeds a predetermined value, and means under the control of said last mentioned means having a time delayed action for removing an additional increment of load if the power flow in said circuit still exceeds said predetermined value.

5. A load regulating system comprising a power supply circuit, variable load means connected to be supplied with power from said circuit, power responsive means connected to said circuit, said means assuming a control position when a predetermined maximum power flows in said circuit, means operative when said power responsive means reaches said control position for removing an increment of load from said circuit for a predetermined time, and additional means jointly controlled by said last mentioned means and said power responsive means for removing an additional increment of load for a predetermined time provided said power responsive means remains in its control position.

6. A load regulating system comprising a power supply circuit, variable load means connected to be energized from said circuit, means connected to said circuit for assuming a control position upon a predetermined maximum power flow in said circuit being exceeded, means operative a predetermined time after said power responsive means attains said control position for removing an increment of load from said circuit for a predetermined time, and means operative a predetermined time after the operation of said last mentioned means provided said power responsive means is in its control position for removing another increment of load from said circuit for a predetermined time.

7. In combination, a power supply circuit, a variable load including a normally energized individually removable incremental load connected to receive power from said circuit, a relay connected to be responsive to the power flow in said circuit, said relay having an overpower circuit controlling position, a relay which is actuated when said power responsive relay reaches its overpower position, said last mentioned relay having a time delayed action in reaching its circuit controlling position, a relay which is actuated when said time delayed acting relay reaches its circuit controlling position, and means controlled by said last mentioned relay for removing said incremental load.

8. In combination, a power supply circuit, an individually removable incremental load connected to be energized from said circuit, a relay having an overpower circuit controlling position connected to be responsive to the power flow in said circuit, a time delayed acting relay which is actuated when said power relay reaches its overpower position, means under the control of said time delayed acting relay for removing said incremental load, said means including means for removing the control of said time delayed acting relay from said power responsive relay when it is actuated, and means operative after a predetermined time for causing said load removing means to restore said load thereby restoring control of said time delayed acting relay to said power responsive relay.

9. The combination with a loaded power supply circuit of means for successively removing increments of load from said circuit if the total power flow therethrough exceeds a predetermined amount comprising a power responsive relay connected to said circuit, said relay having an overpower position, a time delayed acting relay under the control of said power responsive relay, a second relay under the control of said time delayed acting relay, said second relay including quick and slow acting elements, means under the control of said quick acting elements for removing an increment of load from said circuit, and means under the control of said slow acting elements and operative after a predetermined time for removing an additional increment of load from said circuit.

10. The combination with a loaded power supply circuit of load limiting means comprising a relay which is operative in accordance with the power flow in said circuit, said relay having an overpower circuit controlling position, a slow acting relay whose action is initiated when said power relay assumes its overpower position, another relay having quick and slow acting elements and under the control of said slow acting relay when its action is completed, means under the control of said quick acting elements for removing an increment of load from said power supply circuit, a time delayed acting relay for restoring said increment of load after a predetermined time, said quick acting elements also transferring the control of said other relay from the slow acting relay to the delayed acting relay, a circuit which is also under the control of said power relay controlled by said slow acting elements of said other relay, and means included in said last mentioned circuit for removing a second increment of load for a predetermined time.

11. In combination, a power supply circuit, a variable load including an individually removable incremental load connected to said circuit, an overpower relay connected to respond to the power flow in said circuit, a normally open time-delayed closing relay under the control of said overpower relay, and means responsive to the closing of said normally open time delayed closing relay for removing sid incremental load from said circuit.

12. In combination, a power supply circuit, a variable load connected to said circuit, a load regulator for said circuit comprising an overpower closing relay connected to said circuit, a circuit controlled by said overpower closing relay, a normally closed time delayed opening relay having contacts and operating means included in said circuit, another relay having its operating coil connected in said circuit, a control circuit including means for removing an incremental load from said power supply circuit controlled by said other relay, and a second control circuit controlled by said other relay for making the energization of said time delayed opening relay independent of said overpower relay.

13. A load regulating system comprising a power supply circuit, a variable load connected to receive power from said circuit, an overpower closing relay connected to said circuit, a relay having normally closed and normally open contacts, a normally open time delayed closing relay, a circuit controlled by said overpower closing relay including the normally closed contacts of said second mentioned relay and the operating means of said time delayed closing relay, a normally closed time delayed opening relay, a circuit including the contacts of said time delayed closing relay, the controls of said time delayed opening relay, the operating means of said time delayed opening relay and the operating means of said second mentioned relay, a circuit including means for reducing the load on said power supply circuit controlled by the normally open contacts of said second mentioned relay, and another circuit controlled by the normally open contacts of said second mentioned relay for short circuiting the contacts of said normally closed time delayed opening relay.

14. In combination, a power supply circuit, a variable load including individually removable incremental loads connected to said circuit, an overpower relay connected to said circuit, a normally open time delayed closing relay under the control of said overpower relay, a second normally open relay under the control of said time delayed closing relay, means under the control of said last mentioned relay for removing said incremental loads, a second normally open time delayed closing relay under the control for said last mentioned relay, and means operated upon the closure of said second time delayed relay for removing a second incremental load from said circuit.

15. In combination, a power supply circuit, a variable load connected to said circuit, a load regulator for said circuit comprising an overpower closing relay connected to said circuit, a circuit controlled by said overpower closing relay, a normally closed time delayed opening relay having contacts and operating means included in said controlled circuit, another relay having an operating coil included in said controlled circuit, a second circuit controlled by said other relay and including means for removing an incremental load from said power supply circuit, a third circuit controlled by said other relay for making the energization of said time delayed opening relay independent of said overpower relay, and a fourth circuit controlled jointly by said overpower relay and said other relay for removing a second incremental load from said power circuit for a predetermined time.

16. A load regulating system comprising a power supply circuit, a variable load connected to said circuit, an overpower relay connected to said circuit, a relay having normally closed and normally open contacts and time delayed closing contacts, a normally open time delayed closing relay, a circuit controlled by said overpower relay including the normally closed contacts of said second mentioned relay and the operating means of said time delayed closing relay, a normally closed time delayed opening relay, a circuit including the contacts of said time delayed opening and closing relays, and the operating means of said time delayed opening relay and said second mentioned relay, a circuit including means for reducing the load on said power supply circuit controlled by the normally open contacts of said second mentioned relay, a second circuit controlled by the normally open contacts of said second mentioned relay for short circuiting the contacts of said normally closed time delayed opening relay, a third circuit under the joint control of said overpower relay and the time delayed closing contacts of said second mentioned relay, and means including a second normally open time delayed closing relay and a second normally closed time delayed opening relay energized by said third circuit for further reducing the load on said power supply circuit.

In witness whereof, I have hereunto set my hand this 20th day of November, 1930.

DAVID W. McLENEGAN.